(12) United States Patent
Shim et al.

(10) Patent No.: US 11,358,602 B2
(45) Date of Patent: Jun. 14, 2022

(54) METHOD OF DETERMINING VEHICLE DRIVING PATTERN

(71) Applicants: Hyundai Motor Company, Seoul (KR); Kia Motors Corporation, Seoul (KR)

(72) Inventors: Jae Yun Shim, Hwaseong-si (KR); Jea Mun Lee, Seoul (KR); Kyung Taek Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 195 days.

(21) Appl. No.: 16/690,557

(22) Filed: Nov. 21, 2019

(65) Prior Publication Data

US 2020/0189606 A1 Jun. 18, 2020

(30) Foreign Application Priority Data

Dec. 12, 2018 (KR) .................. 10-2018-0160259

(51) Int. Cl.
| | | |
|---|---|---|
| *B60W 40/09* | (2012.01) | |
| *B60W 40/076* | (2012.01) | |
| *B60W 40/13* | (2012.01) | |
| *B60W 40/105* | (2012.01) | |

(52) U.S. Cl.
CPC .......... *B60W 40/09* (2013.01); *B60W 40/076* (2013.01); *B60W 40/105* (2013.01); *B60W 40/13* (2013.01); *B60W 2540/10* (2013.01); *B60W 2552/15* (2020.02)

(58) Field of Classification Search
CPC .... B60W 40/09; B60W 40/076; B60W 40/13; B60W 40/105; B60W 2552/15; B60W 2540/10
See application file for complete search history.

(56) References Cited

U.S. PATENT DOCUMENTS

| 8,965,691 B1* | 2/2015 | Lombrozo | ............ B60W 40/10 |
| | | | 701/498 |
| 2014/0188378 A1* | 7/2014 | Sawhill | .................. G08G 5/045 |
| | | | 701/122 |
| 2016/0280224 A1* | 9/2016 | Tatourian | ............ B60W 30/143 |
| 2017/0089274 A1* | 3/2017 | Koi | ...................... F02D 41/0002 |
| 2018/0126980 A1* | 5/2018 | Kim | ........................ B60W 40/06 |
| 2019/0111925 A1* | 4/2019 | Sata | ........................ B60W 10/10 |

\* cited by examiner

*Primary Examiner* — Scott A Reinbold
(74) *Attorney, Agent, or Firm* — Lempia Summerfield Katz LLC

(57) ABSTRACT

A method of determining a vehicle driving pattern includes: acquiring current driving information to determine the vehicle driving pattern of a driver while a vehicle is driven; determining the vehicle driving pattern of a driving condition with which the acquired current driving information is satisfied from a plurality of vehicle driving patterns divided based on the driving condition; determining whether the determined vehicle driving pattern satisfies an entry condition of an aggressive driving pattern based on a driving load of the vehicle and a value of an accelerator pedal sensor according to a driver's operation of an accelerator pedal, while the acquired current driving information satisfies the driving condition of the determined vehicle driving pattern; and determining that the current vehicle driving pattern is the aggressive driving pattern when the entry condition of the aggressive driving pattern is satisfied.

17 Claims, 3 Drawing Sheets

METHOD OF DETERMINING VEHICLE DRIVING PATTERN

CROSS REFERENCE TO RELATED APPLICATION

The present application claims priority to Korean Patent Application No. 10-2018-0160259, filed Dec. 12, 2018, the entire contents of which is incorporated herein for all purposes by this reference.

BACKGROUND

Field

The present disclosure relates to a method of determining a vehicle driving pattern.

Description of the Related Art

Recently, there have been an increasing number of cases in which a driver's vehicle driving pattern corresponding to a current driving situation is determined by utilizing information collected in a vehicle and the determined vehicle driving pattern controls an in-vehicle device or is used as information.

For example, the vehicle driving pattern corresponding to the current driving situation in the vehicle is determined to be used as information needed to control the driving of an engine or a motor which is a driving source of the vehicle or control the operation of a device such as a transmission and to be used as basic information for generating or displaying other additional information.

Thus, efforts to recognize the vehicle driving pattern and utilize the vehicle driving pattern for the control are continuously being carried out. Accurate classification of the vehicle driving pattern is a very important factor in achieving fuel economy optimization and is a technical field in which continuous development can be achieved.

The disclosure of this section is to provide background of the invention. Applicant notes that this section may contain information available before this application. However, by providing this section, Applicant does not admit that any information contained in this section constitutes prior art.

SUMMARY

Aspects of the present invention provide a method of determining a vehicle driving pattern, the method being capable of accurately determining a vehicle driving pattern based on an actual driving situation and thus contributing to improvements in vehicle fuel economy and control.

Aspects of the present invention provide a method of determining a vehicle driving pattern, the method being capable of making driving pattern determination more precise by subdividing an aggressive driving pattern, thereby contributing to improvement in control and efficiency using driving pattern information.

One aspect of the invention provides a method of determining a vehicle driving pattern, the method including: acquiring, by a controller, current driving information to determine the vehicle driving pattern of a driver while a vehicle is driven; determining, by the controller, the vehicle driving pattern of a driving condition with which the acquired current driving information is satisfied from a plurality of vehicle driving patterns divided based on the driving condition; determining, by the controller, whether the determined vehicle driving pattern satisfies an entry condition of an aggressive driving pattern based on a driving load of the vehicle and a value of an accelerator pedal sensor in response to a driver's operation of an accelerator pedal, while the acquired current driving information satisfies the driving condition of the determined vehicle driving pattern; and determining, by the controller, that the current vehicle driving pattern is the aggressive driving pattern when the entry condition of the aggressive driving pattern is satisfied.

According to a method of determining a vehicle driving pattern according to aspects of the present invention, an additional determination criteria are newly introduced and applied to each driving pattern classified based on driving information during driving of the vehicle, whereby it is possible to discriminate or recognize accurately the vehicle driving pattern and to discriminate and determine the driving pattern that is more consistent with the actual driving situation.

Also, since the vehicle driving pattern can be accurately and precisely segmented and discriminated, there are advantages that it is possible to perform accurate and precise control depending on the driving pattern, and to improve the vehicle fuel economy, as well as control for in-vehicle devices such as an engine, motor, transmission, and the like.

BRIEF DESCRIPTION OF THE DRAWINGS

The above and other aspects, features and other advantages of the present invention will be more clearly understood from the following detailed description when taken in conjunction with the accompanying drawings, in which.

DETAILED DESCRIPTION OF EMBODIMENTS

Figure 1:
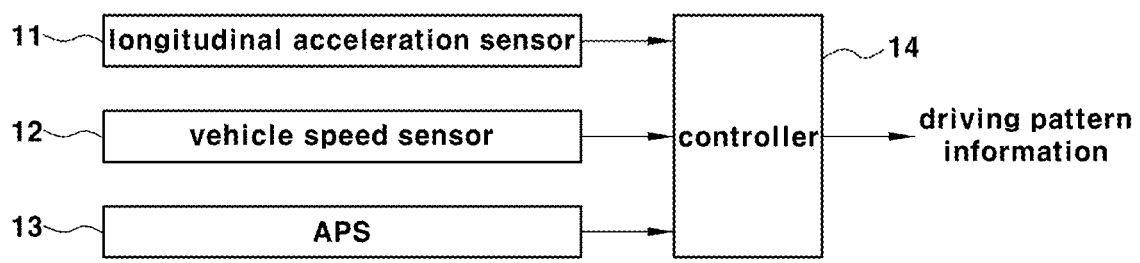
FIG. 1 is a block diagram illustrating a configuration of an apparatus for performing a procedure of determining a vehicle driving pattern according to an embodiment of the present invention.

Hereinafter, embodiments of the present invention will be described in detail with reference to the accompanying drawings so that those skilled in the art can easily carry out the present invention. However, the present invention is not limited to the embodiments described herein but may be embodied in other forms. Throughout the specification, when a certain part is referred to "having" an element, this means it can include other elements as well, rather than excluding other elements unless specifically stated otherwise.

In implementations of determining a vehicle driving pattern, various methods may range from a basic method of classifying the vehicle driving pattern based on a vehicle speed to a method of classifying the vehicle driving pattern using environment information, such as outside temperature, or driving habits of the driver.

However, when the driving pattern is erroneously recognized or determined, and when the driving pattern is erroneously determined to be different from the current driving situation and used for the control, an error may occur as a result of the control, and a target fuel economy optimization becomes difficult to achieve.

For example, it is not known how to distinguish and determine an aggressive driving pattern correctly. Therefore, the vehicle is mistakenly recognized as being in an aggressive driving situation even when the vehicle is driving uphill or driving downhill, or the vehicle is mistakenly recognized not to be in an aggressive driving situation when the vehicle temporarily encounters a downhill driving situation even during an aggressive driving situation.

In addition, a simple high-speed driving situation may be mistakenly recognized as an aggressive driving pattern.

Further, since an aggressive driving pattern is not yet precisely classified, the same control is performed even when an aggressive driving level is different for each situation, whereby there may be difficulties in reduction of control.

When determining a vehicle driving pattern of a driver based on information collected by the vehicle, the driving situation may be divided into several driving patterns depending on the outside temperature, driving load, vehicle speed, and electric field load, which are basic factors to the driving environment.

For example, it is possible to recognize an aggressive driving pattern by determining repetitive acceleration intents of a driver and a high driving load in the vehicle. Specifically, it is possible to determine a high accelerator pedal sensor (hereinafter, referred to as 'APS') state in which a signal value of the APS exceeds a reference value and a high driving load state in which the driving load exceeds a reference value.

The driving load (traction power, traction energy) may be calculated as a total power that a driving source of the vehicle needs to output in response to the driver's operation of the accelerator pedal. In the case of a hybrid vehicle, the driving load may be calculated as a total target power of an engine and a motor.

As a result, it may be determined that the vehicle is in an aggressive driving situation in the case of the high APS state as described above and in the case of the high driving load state.

However, when an aggressive driving pattern is determined only by the driver's acceleration intent and the driving load, uphill driving and downhill driving states may be mistaken for an aggressive driving situation.

For example, when the APS value and the driving load increase as the load increases due to a slope while driving uphill, this is not be recognized as the uphill driving situation, but mistaken for an aggressive driving situation.

Also, when the vehicle temporarily encounters the downhill driving situation during an aggressive driving situation, the setting of an aggressive driving pattern may be released during the driving due to the reduction of the driving load.

In addition, since the high-speed driving situation may be mistaken for an aggressive driving pattern, the driving load may be monitored to discriminate or identify a high-speed driving situation from an aggressive driving pattern. However, when the reference value is not classified based on the driving environment, mistaken recognition occurs.

In addition, when an aggressive driving pattern and the control depending on an aggressive driving pattern are not be subdivided, the same control may be performed even when an aggressive level is different, whereby the control is reduced.

For example, when an aggressive driving pattern is not subdivided based on determination of whether the driving load is large and small, and whether the driving load increases and decreases due to external factors, in an aggressive driving situation, the same control may be performed for different driving patterns that may require different control plans.

In aspects of the present invention, the method is focused on subdividing an aggressive driving pattern to determine an aggressive driving pattern consistent with the actual driving situation of the vehicle.

In embodiments of the present invention, road slope and vehicle speed are used as driving information to be referred to when recognizing an aggressive driving pattern, and the entry condition of an aggressive driving pattern is further subdivided based on such driving information.

Hereinafter, a method of determining a vehicle driving pattern according to embodiments of the present invention will be described in detail.

Figure 2A:
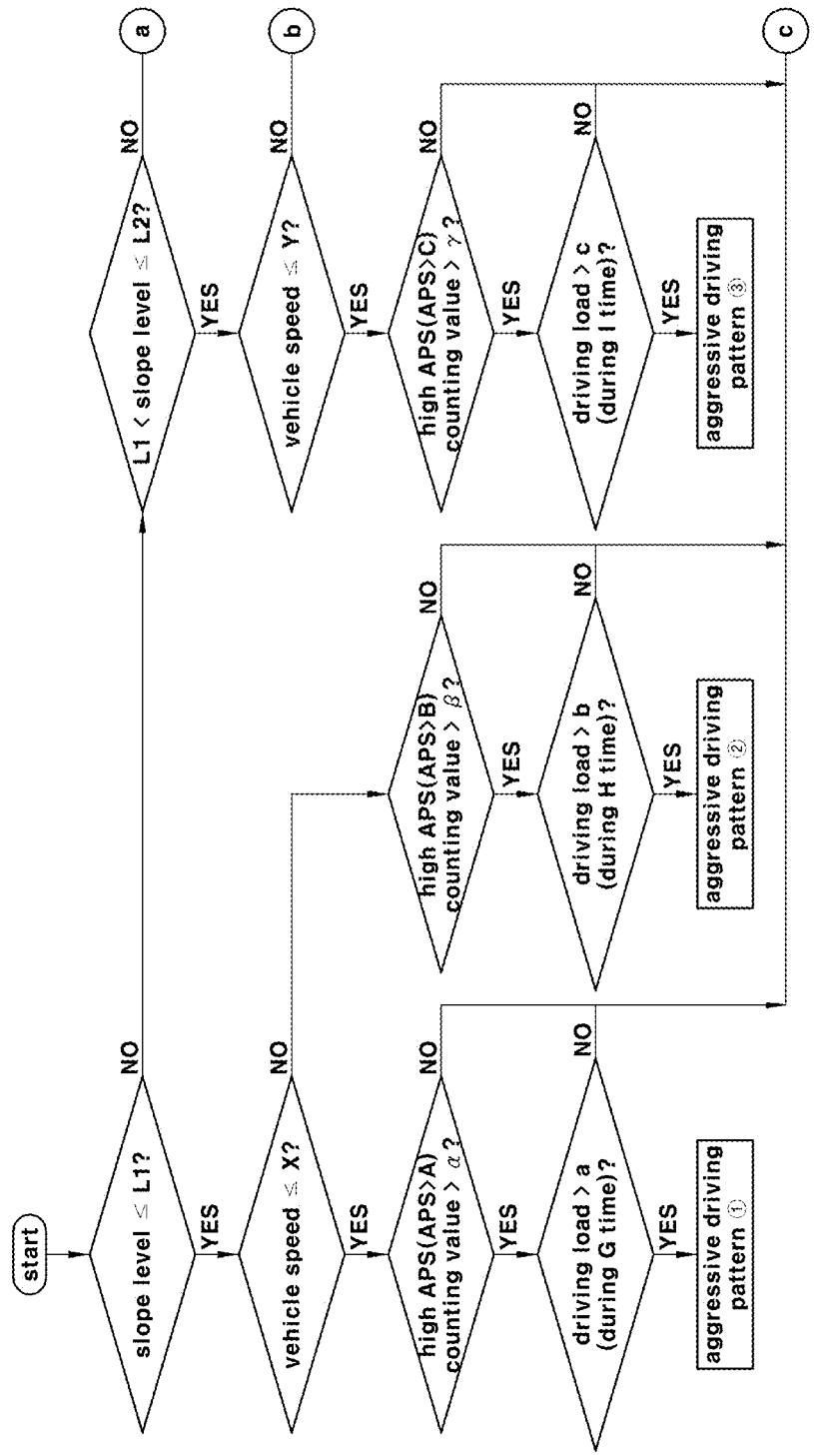
FIGS. 2A and 2B are flowcharts illustrating a method of determining a vehicle driving pattern according to an embodiment of the present invention.
Figure 2B:
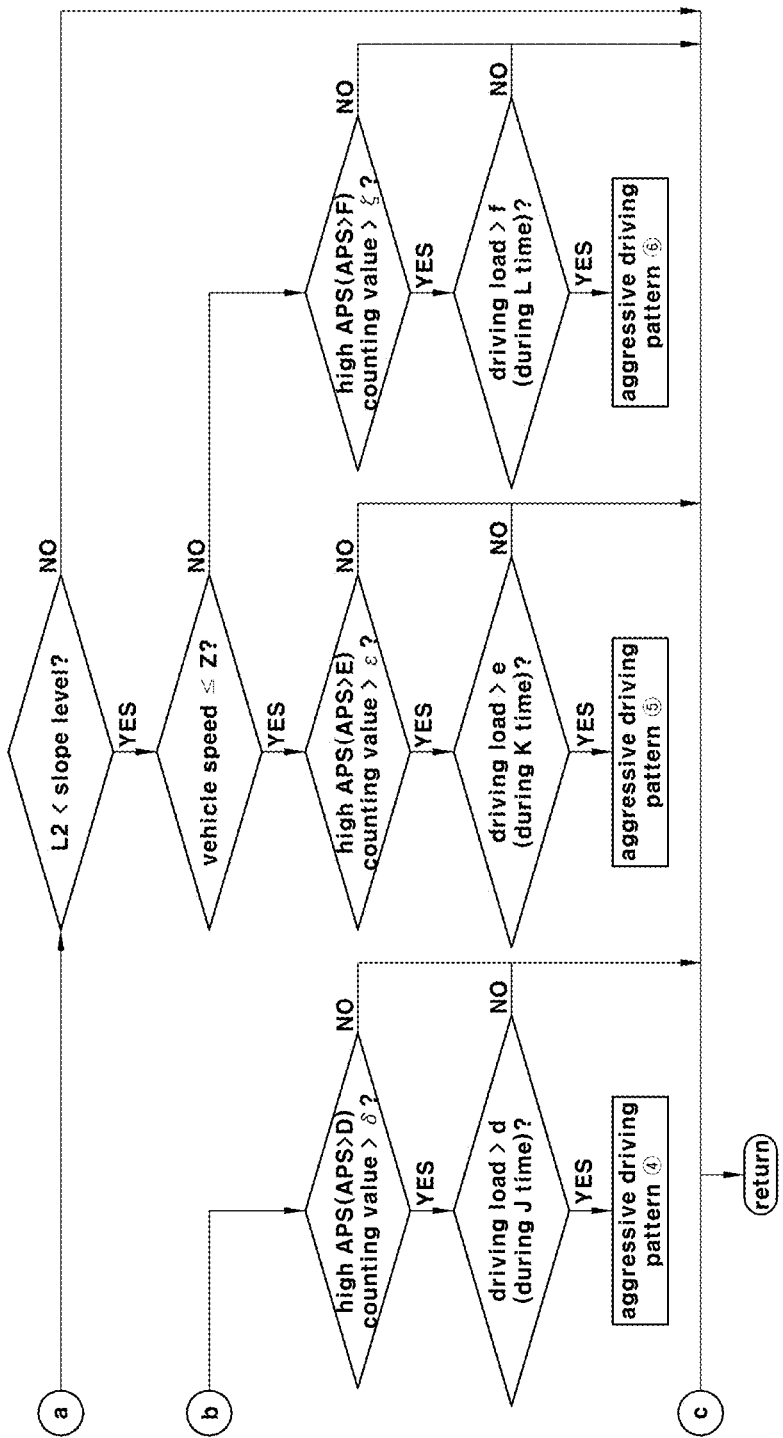

FIG. 1 is a block diagram illustrating a configuration of an apparatus for performing a procedure of determining a vehicle driving pattern according to embodiments of the present invention, and FIGS. 2A and 2B are flowcharts illustrating a method of determining a vehicle driving pattern according to an embodiment of the present invention.

A method of determining a vehicle driving pattern according to embodiments of the present invention includes acquiring, by a controller 14, current driving information to determine the vehicle driving pattern of a driver while the vehicle is driven; determining, by the controller 14, the vehicle driving pattern of a driving condition with which the acquired current driving information is satisfied from a plurality of vehicle driving patterns divided based on the driving condition; determining, by the controller 14, whether the determined vehicle driving pattern satisfies an entry condition of an aggressive driving pattern based on a driving load of a vehicle and a value of an accelerator pedal sensor in response to a driver's operation of an accelerator pedal, while the acquired current vehicle driving information satisfies the driving condition of the determined vehicle driving pattern; and determining, by the controller 14, that the current vehicle driving pattern is an aggressive driving pattern when the entry condition of an aggressive driving pattern is satisfied.

Herein, the driving information for determining the vehicle driving pattern of the driver is a real-time vehicle speed and a slope of a driving road acquired through sensors 11 and 12.

Herein, a slope condition for determining one of an uphill driving road, a flat road, and a downhill driving road indicating a road slope state from the slope of the driving road; and a vehicle speed condition for dividing a vehicle speed state for each of the uphill driving road, the flat road, and the downhill driving road are set in the controller 14.

In addition, the controller 14 determines that the vehicle driving pattern in which the current driving information satisfies the slope condition and the vehicle speed condition is determined as a vehicle driving pattern corresponding to the current driving information.

A configuration of an apparatus for performing a procedure for determining a vehicle driving pattern according to an embodiment of the present invention is illustrated in FIG. 1, and a method of determining a vehicle driving pattern according to an embodiment of the present invention is illustrated in FIGS. 2A and 2B.

Referring to FIG. 1, it may be seen that a plurality of sensors 11, 12, and 13 are used to collect information needed for the controller 14 to determine the vehicle driving pattern.

FIG. 1 shows an example using a longitudinal acceleration sensor 11, a vehicle speed sensor 12, and an accelerator pedal sensor (APS) 13.

Referring to FIGS. 2A and 2B, when determining the driving pattern corresponding to the current driving situation from the subdivided driving patterns, it is shown that a road slope of driving road, a vehicle speed, a APS value, and a driving load (traction power) are used.

The determination of the vehicle driving pattern according to embodiments of the present invention may be performed in an in-vehicle controller 14, and the controller 14 determines the vehicle driving pattern using information collected in the vehicle via sensors 11, 12, and 13.

First, the controller 14 collects driving information for determining the vehicle driving pattern during the vehicle driving and determines whether or not the predetermined condition of the driving pattern is satisfied from the collected driving information.

In embodiments of the present invention, the road slope and the vehicle speed are used as the driving information as described above. With respect to the road slope, a real-time road slope (%) information of the driving road can be acquired using a signal of the longitudinal acceleration sensor (G sensor) 11 equipped in the vehicle.

In embodiments of the present invention, the controller 14 acquires the slope information of the driving road from the signal of the longitudinal acceleration sensor 11 and then determines the slope state of the current road using the preset information.

Herein, the controller 14 determines the current slope level from the slope of the driving road acquired through the longitudinal acceleration sensor 11 and selects one slope state from among downhill driving road, flat road, and uphill driving road using the determined slope level.

In the embodiment of the present invention, the road slope state may be divided into three stages of the downhill driving road, flat road, and the uphill driving road based on the slope of the driving road acquired by the sensor 11. Examples of levels assigned depending on the road slope (%) are listed in a table 1 below.

TABLE 1

| road slope(%) | G < −12 | −12 ≤ G < −7.5 | −7.5 ≤ G < −3.7 | −3.7 ≤ G < −2.2 | −2.2 ≤ G < 2.2 |
|---|---|---|---|---|---|
| level | −4 | −3 | −2 | −1 | 0 |
| road slope(%) | 2.2 ≤ G < 3.7 | 3.7 ≤ G < 7.5 | 7.5 ≤ G < 12 | 12 ≤ G | |
| level | 1 | 2 | 3 | 4 | |

The numerical values (boundary values) of the road slope that distinguish the levels in the above Table 1 are illustrative, and the present invention is not limited thereto. The numerical values of the road slope may be variously changed based on the vehicle conditions and the like.

When the road slope is acquired from the signal of the longitudinal acceleration sensor 11 in the state where the setting information as shown in the Table 1 is input and stored in the controller 14 in advance, the slope level is obtained from the road slope.

Referring to the setting information in the above Table 1, a plurality of slope intervals are set in the controller 14 each having a predetermined slope range, in which a level value is preset for each slope interval.

As a result, by using the setting information as shown in Table 1, the controller 14 may determine a level value of an interval to which a value of the real-time road slope belongs.

Also, depending on the level value, the road slope state may be determined to be one of the downhill driving road, the flat road (including gentle slope), and the uphill driving road. For example, as shown in FIGS. 2A and 2B, the road slope state is determined to be the downhill driving road when the slope level value is less than or equal to L1 (e.g., 0), determined to be the flat road (gentle slope) when the slope level value is greater than L1 and less than or equal to L2 (e.g., 2), and determined to be an uphill driving road when the slope level value is greater than L2.

In embodiments of the present invention, the discrimination and setting of the road slope value, the level corresponding to the slope value, and the road slope state corresponding to the level may be set differently depending a type of vehicle or a characteristic of vehicle hardware. When actually being applied, there may be differences in the setting example in the Table 1 and the above description and numerical values, and various changes and modifications are possible.

In addition, in the above description, a numerical value is set and indexed for each level, and the road slope state is subdivided into the downhill driving road, the flat road, and the uphill driving road based on the level value. However, instead of using the slope level, it is possible to use a map in which the slope values are mapped to dividing areas (downhill driving road, flat road, and uphill driving road) of the road slope state as described above.

Using the map, it is possible to determine the road slope state as one of the downhill driving road, the flat road, or the uphill driving road from the road slope value.

Next, the vehicle speed level may be set in the controller 14 based on the vehicle speed, and two levels of a low-to-medium speed and a high speed may be separately set based on the vehicle speed level.

In an embodiment of the present invention, the vehicle speed may be divided into two levels, a low-to-medium speed and a high speed, and a Table 2 below shows examples of levels depending on the vehicle speed.

Herein, the vehicle speed is information detected by the sensor 12 during the vehicle driving. The vehicle speed may be any momentary vehicle speed, but it is preferable that an average vehicle speed for a predetermined time preceding the present time is used rather than the momentary vehicle speed.

TABLE 2

| Average vehicle speed(km/hr) | 0 ≤ V < 13 | 13 ≤ V < 27 | 27 ≤ V < 57 | 57 ≤ V < 76 | 76 ≤ V < 87 | 87 ≤ V |
|---|---|---|---|---|---|---|
| level | 0 | 1 | 2 | 3 | 4 | 5 |

The vehicle speed values (boundary values) that distinguish the levels in the above Table 2 are illustrative, and the present invention is not limited thereto. The vehicle speed values may be changed depending on the vehicle application conditions.

The vehicle speed level is acquired based on the vehicle speed detected by the sensor 12 in a state in which the setting information as shown in Table 2 is input and stored in the controller 14 in advance.

Referring to the setting information as shown in Table 2, a plurality of vehicle speed intervals each having a predetermined vehicle speed range are set in the controller 14, and a level value is set for each of the vehicle speed intervals. Using the setting information as shown in Table 2, it is possible to determine a level value corresponding to an interval to which the current average vehicle speed belongs.

The vehicle speed may be determined to be one of a low-to-medium speed level and a high speed level depending on the vehicle speed level while the vehicle is driving. For example, when the vehicle speed level is 3 or less, the vehicle speed is determined to be the low-to-medium speed, and when the vehicle speed level is 3 or more, the vehicle speed is determined to be the high speed.

Alternatively, the vehicle speed state may be set to be divided into three levels of a low speed, a medium speed, and a high speed depending on the vehicle speed level, rather than two levels. For example, the vehicle speed state may be determined to be the low speed when the vehicle speed level is 0 and 1, the medium speed when the vehicle speed level is 2 and 3, and the high speed state when the vehicle speed level is 4 and 5.

In embodiments of the present invention, the discrimination and setting of the vehicle speed, the level corresponding to the vehicle speed, and the vehicle speed state corresponding to the level may be set differently based on a type of a vehicle or a characteristic of vehicle hardware. When actually being applied, there may be differences in the setting example in the Table 2 and the above description and numerical values, and various changes and modifications are possible.

In the above description, a numerical value is set and indexed for each vehicle speed level, and the vehicle speed state is divided into two stages of a low-to-medium speed and a high speed, or three stages of a low speed, medium speed, or high speed, based on the vehicle speed level. However, instead of using the vehicle speed level, a map in which the vehicle speed is mapped to each of the divided areas (low-to-medium speed/high speed or low speed/medium speed/high speed) of the vehicle speed state may be used.

Using the map, the vehicle speed may be determined to be one of the low-to-medium speed and the high speed, or one of the low speed, the medium speed, and the high speed, from the vehicle speed value.

FIGS. 2A and 2B show an example in which the vehicle speed state is divided into two stages based on the vehicle speed, in which the road speed state is subdivided into three stages based on the road slope state, and each stage of the road slope state is further divided into two stages based on the vehicle speed.

In FIGS. 2A and 2B, X, Y, and Z represent thresholds when the vehicle speed state is divided into two stages based on the vehicle speed.

Therefore, in the example of FIGS. 2A and 2B, the vehicle speed state is divided into a total of six vehicle driving situations based on the road slope state and the vehicle speed state.

Next, when determining the entry condition of an aggressive driving pattern, high APS determination criteria may to subdivided and set in the controller 14, in order to determine an aggressive driving pattern for each of six vehicle driving situations divided based on the road slope state and the vehicle speed state, as shown in the example of FIGS. 2A and 2B.

For example, the APS reference values A, B, C, D, E, and F used for determining that the vehicle is in the high APS state are set in the controller 14 for each of six vehicle driving situations divided based on the road slope state and the vehicle speed state. Also, reference values, e.g., count reference values $\alpha$, $\beta$, $\gamma$, $\delta$, $\varepsilon$, and $\xi$ for the number of times obtained by counting cases where the APS value is greater than the APS reference values are set in the controller 14.

Accordingly, when the driver operates the accelerator pedal, the controller 14 compares the APS value with the APS reference values A, B, C, D, E, and F corresponding to the road slope state and the vehicle speed state and determines to be a high APS state when the APS value is greater than the APS reference value. Then, the controller 14 counts cases where the APS value is greater than the APS reference values and compares the number of counting times, e.g., counting value with the count reference values $\alpha$, $\beta$, $\gamma$, $\delta$, $\varepsilon$, and $\xi$.

Herein, when the counting value is larger than the count reference values $\alpha$, $\beta$, $\gamma$, $\delta$, $\varepsilon$, and $\xi$ it is determined whether or not the driving load satisfies the entry condition of an aggressive driving pattern.

To this end, the high driving load state may be subdivided into six states and set in the controller 14, in order to determine that the vehicle is in an aggressive driving pattern for each of six situations divided based on the road slope state and the vehicle speed state.

In this case, the load accumulation time G, H, I, J, K, and L for calculating the driving load is set in the controller 14 for each of the six situations, and the load reference values a, b, c, d, e, and f are set in the controller 14 for each of six situations in order to determine that the vehicle is in the high driving load state from the driving load calculated during the load accumulation time.

In addition, in the embodiment of the present invention, when the driving load is greater than the load reference value, the controller 14 finally determines that the current driving situation is in an aggressive driving pattern.

As a result, in the embodiment of FIGS. 2A and 2B, an aggressive driving pattern is subdivided into a total of six aggressive driving patterns based on the determination criteria. When each of the determination criteria is satisfied, the vehicle driving pattern may be determined as one of six aggressive driving patterns.

In an embodiment of the present invention, a total of required driving load of an engine and a motor that are a power source, e.g., a vehicle driving source, is accumulated and calculated during the accumulated load time set for each situation.

In embodiments of the present invention, as described above, the accumulation time of the driving load is subdivided into six, so that the determination condition of an aggressive driving pattern is subdivided.

In this case, it is possible to intuitively perform calibration for the threshold value of the pattern determination and thus improve the accuracy, by differentiating even the accumulation time as compared with the case of subdividing only the driving load.

For example, when the road slope is greater, the accumulative time is set to be short, whereby it is easy to distinguish that the driving load is increased by the road slope.

In the embodiment of the present invention, a value obtained by accumulating the driving load for a predetermined time is used in order to increase the accuracy of the driving load determination and to prevent chattering of the driving pattern determined. However, it is possible to use the driving load (a total power of engine and motor) in real time.

It is also possible to use the energy value per unit distance by dividing the accumulated energy of the driving load (a total power of engine and motor) for a certain period of time, by the driving distance.

As shown 2A and 2B, in the method of determining the driving pattern according to embodiments of the present invention, the determination criteria such as the APS reference value, the count reference value, and the load reference value are additionally introduced and applied for each of the driving situations divided based on the road slope and the vehicle speed that are the vehicle driving information, whereby it is possible to discriminate accurately the vehicle driving pattern and to divide and determine the driving pattern that is more consistent with the actual driving situation.

As a result, as the vehicle driving pattern can be accurately and precisely segmented and discriminated, there are advantages that it is possible to perform accurate and precise control required for the vehicle when the discriminated driving pattern is utilized for control, and to improve the vehicle fuel economy, as well as control for in-vehicle devices such as engine, motor, transmission, and the like.

Further considering the fuel economy effect, embodiments of the present invention can minimize chances of erroneous determination on an aggressive driving pattern and improve the fuel economy that would have been lowered by erroneous control due to mistaken recognition or erroneous determination.

It is possible to improve the overcharging of the battery SOC caused by mistaking the high-speed driving or the uphill driving for an aggressive driving pattern, and to improve an over-discharging of the battery SOC due to pattern unrecognition even in an aggressive driving situation at low speed.

Also, according to embodiments of the present invention, as an aggressive driving pattern is subdivided, the control can be optimized and the fuel economy can be improved.

Further, according to embodiments of the present invention, since an aggressive driving pattern is subdivided into a larger number, it is possible to further subdivide an aggressive driving pattern based on the discriminated driving pattern when controlling the engine on/off, the engine operating point, and the shifting pattern.

In addition, compared with erroneous determination of driving pattern, the performance of the driving strategy recognition based on actual driving situation can be improved.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

While the present invention has been particularly shown and described with reference to embodiments thereof, it is to be understood that the invention is not limited to the disclosed embodiments, but, on the contrary, is intended to cover various modifications and equivalent arrangements included within the spirit and scope of the appended claims.

What is claimed is:

1. A method of determining a vehicle driving pattern, the method comprising:
   acquiring, by a controller, current driving information to use in determining the vehicle driving pattern of a driver while a vehicle is driven;
   determining, by the controller, one of a plurality of vehicle driving patterns divided based on the driving conditions such that the acquired current driving information satisfies the driving condition of the determined vehicle driving pattern;
   determining, by the controller, whether the determined vehicle driving pattern satisfies an entry condition of an aggressive driving pattern based on a driving load of the vehicle and a value of an accelerator pedal sensor in response to a driver's operation of an accelerator pedal, while the acquired current driving information satisfies the driving condition of the determined vehicle driving pattern;
   determining, by the controller, that the current vehicle driving pattern is the aggressive driving pattern when the entry condition of the aggressive driving pattern is satisfied; and
   controlling an in-vehicle device in accordance with the determined aggressive driving pattern,
   wherein, when determining the entry condition of the aggressive driving pattern, high accelerator pedal sensor (APS) determination criteria is subdivided into a plurality of states and set in the controller to determine the aggressive driving pattern for each of a plurality of vehicle driving situations based on a road slope state and a vehicle speed state,
   wherein load reference values are set in the controller for each of the plurality of vehicle driving situations to determine that the vehicle is in a high driving load state from the driving load calculated during a load accumulation time, and
   wherein, when the driving load is greater than the load reference value, the controller determines that a current vehicle driving situation is in the aggressive driving pattern.

2. The method of claim 1, wherein the driving information for determining the vehicle driving pattern of the driver is a real-time vehicle speed and a slope of a driving road acquired through a sensor.

3. The method of claim 2, wherein a slope condition for determining one of an uphill driving road, a flat road, and a downhill driving road indicates a road slope state from the slope of the driving road; and
   wherein a vehicle speed condition for dividing a vehicle speed state for each of the uphill driving road, the flat road, and the downhill driving road is set in the controller, and
   wherein the controller determines that the vehicle driving pattern in which the current driving information satisfies the slope condition and the vehicle speed condition is determined as a vehicle driving pattern corresponding to the current driving information.

4. The method of claim 3, wherein a plurality of slope intervals each having a predefined slope range are set in the controller, in which a slope level value is set for each slope interval, and
   wherein the determining of one of the plurality of vehicle driving patterns includes:
   determining, by the controller, the slope level value from the acquired slope of the driving road, and
   determining, by the controller, the road slope state as one of the uphill driving road, the flat road, and the downhill driving road from the slope level value.

5. The method of claim 3, wherein the determining of one of the plurality of vehicle driving patterns includes:
   determining, by the controller, the road slope state as one of the uphill driving road, the flat road, and the downhill driving road using a map from the acquired slope of the driving road.

6. The method of claim 3, wherein the vehicle speed condition for dividing the vehicle state into a low-to-medium speed and a high speed or the vehicle speed condition for dividing the vehicle state into a low speed, a medium speed, and a high speed are set in the controller, for each of the uphill driving road, the flat road, and the downhill driving road.

7. The method of claim 3, wherein a plurality of vehicle speed intervals each having a predefined vehicle speed range are set in the controller, in which a vehicle speed level value is set for each vehicle speed interval, and
wherein the determining of one of the plurality of vehicle driving patterns includes:
determining, by the controller, the vehicle speed level value from the acquired real-time vehicle speed; and
determining, by the controller, the vehicle speed driving pattern by determining the vehicle speed state corresponding to the vehicle speed level value.

8. The method of claim 3, wherein the determining of one of the plurality of vehicle driving patterns includes:
determining, by the controller, the vehicle speed state corresponding to the current vehicle speed using a map from the acquired real-time vehicle speed; and
determining, by the controller, the vehicle driving pattern corresponding to the determined vehicle speed state as the vehicle driving pattern corresponding to the current driving information.

9. The method of claim 1, wherein the determining whether the determined vehicle driving pattern satisfies the entry condition of the aggressive driving pattern includes:
counting, by the controller, the number of times of high APS states in which the value of the accelerator pedal sensor is greater than a predetermined APS reference value to determine whether the driving load of the vehicle satisfies a predetermined load condition when the number of times obtained by counting the high APS states exceeds a count reference value.

10. The method of claim 9, wherein the APS reference value and the count reference value are determined for each of the plurality of vehicle driving patterns divided based on the driving conditions.

11. The method of claim 9, wherein when the number of times obtained by counting the high APS states exceeds the count reference value, the driving load of the vehicle is compared with a load reference value, and when the driving load of the vehicle exceeds the load reference value, the entry condition of the aggressive driving pattern is determined to be satisfied.

12. The method of claim 11, wherein the APS reference value, the count reference value, and the load reference value are determined for each of the plurality of vehicle driving patterns divided based on the driving conditions.

13. The method of claim 1, wherein the driving load is calculated by accumulating a total of target power that a vehicle driving source has to output during a predetermined load accumulation time.

14. The method of claim 1, wherein the driving load is a power value per a unit distance calculated by dividing a value obtained by accumulating a total of target power that a vehicle driving source has to output during a predetermined load accumulation time by a driving distance.

15. The method of claim 13, wherein the load accumulation time is set for each of the plurality of vehicle driving patterns divided based on the driving conditions.

16. The method of claim 14, wherein the load accumulation time is set for each of the plurality of vehicle driving patterns divided based on the driving conditions.

17. The method of claim 1, wherein the driving load is a total of real-time target power that a vehicle driving source has to output.

* * * * *